US006741616B1

(12) United States Patent
Sutherland et al.

(10) Patent No.: US 6,741,616 B1
(45) Date of Patent: May 25, 2004

(54) SWITCH FABRIC FOR ASYNCHRONOUSLY TRANSFERRING DATA WITHIN A CIRCUIT

(75) Inventors: Ivan E. Sutherland, Santa Monica, CA (US); William S. Coates, Los Altos, CA (US); Ian W. Jones, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 783 days.

(21) Appl. No.: 09/685,009

(22) Filed: Oct. 5, 2000

(51) Int. Cl.[7] .................................................. H04J 3/04
(52) U.S. Cl. ...................... 370/535; 370/380; 327/407
(58) Field of Search .................................. 370/370, 380, 370/381, 535, 536, 537; 327/407, 408, 415, 416

(56) References Cited

U.S. PATENT DOCUMENTS

| 5,065,394 A | | 11/1991 | Zhang .......................... 370/60 |
| 5,768,265 A | * | 6/1998 | Toyohara ..................... 370/282 |
| 6,148,010 A | * | 11/2000 | Sutton et al. ................ 370/536 |
| 6,466,590 B1 | * | 10/2002 | Park et al. ................... 370/535 |

FOREIGN PATENT DOCUMENTS

| EP | 0 472 879 A2 | 7/1991 | ........... G06F/15/16 |
| EP | 0 506 135 A2 | 3/1992 | ........... G06F/15/16 |
| EP | 1 016 980 A2 | 12/1999 | ......... G06F/15/173 |

* cited by examiner

*Primary Examiner*—Chau Nguyen
*Assistant Examiner*—Andrew Wahba
(74) *Attorney, Agent, or Firm*—Park, Vaughan & Fleming LLP

(57) ABSTRACT

One embodiment of the present invention provides a system that facilitates asynchronously routing data within a circuit. This system includes a data destination horn, for routing data from a trunk line to a plurality of destinations. This data destination horn includes a plurality of one-to-many switching elements organized into a tree of at least one level that fans out from the trunk line to the plurality of destinations. It also includes a plurality of memory elements for storing data in transit between the plurality of one-to-many switching elements. An asynchronous control structure is coupled to the data destination horn, and is configured to control the propagation of data through the data destination horn, so that when a given data item appears at an input of a memory element, the given data item is asynchronously latched into the memory element as soon space becomes available in the memory element without having to wait for a clock signal. One embodiment of the present invention additionally includes a data source funnel, for routing data from a plurality of sources into the trunk line. This data source funnel includes a plurality of many-to-one switching elements organized into a tree of at least one level that fans in from the plurality of sources to into the trunk line. It also includes a plurality of funnel memory elements for storing data in transit between the plurality of many-to-one switching elements. Moreover, the asynchronous control structure is additionally configured to control propagation of data through the data source funnel.

27 Claims, 16 Drawing Sheets

POINT-TO-POINT**

CROSSBAR**

SHUFFLE**

BUS**

| NETWORK TYPE | PEAK THROUGHPUT (NORMALIZED) | MAXIMUM LATENCY (HOPS) | MAXIMUM WIRE BISECTION | NUMBER OF SWITCHES |
|---|---|---|---|---|
| POINT-TO-POINT | 4 | 4 | 16 | 24 |
| CROSSBAR | 4 | 6 | 8 | 24 |
| SHUFFLE | 2 | 4 | 4 | 8 |
| BUS | 1 | 4 | 4 | 6 |

FIG. 17

SWITCH FABRIC FOR ASYNCHRONOUSLY TRANSFERRING DATA WITHIN A CIRCUIT

RELATED APPLICATIONS

The subject matter of this application is related to the subject matter in a non-provisional application filed on the same day as the instant application by inventor Josephus C. Ebergen, entitled "Asynchronous Implementation of a Multi-Dimensional, Low-Latency, First-In, First-Out (FIFO) Buffer," having Ser. No. 09/677,442 and filing date of Sep. 29, 2000. The subject matter of this application is also related to the subject matter in a non-provisional application filed on the same day as the instant application by inventors Ivan E. Sutherland, Scott M. Fairbanks and Josephus C. Ebergen, entitled "Method and Apparatus for Asynchronously Controlling State Information within a Circuit," having Ser. No. 09/676,430 (Pat. 6,420,970, and filing date and filing date of Sep. 29, 2000. The subject matter of this application is related to the subject matter in a non-provisional application filed on the same day as the instant application by inventors Ivan E. Sutherland, Scott M. Fairbanks and Josephus C. Ebergen, entitled "Asynchronously Controlling Data Transfers Within a Circuit," having Ser. No. 09/676,428(U.S. Pat. No. 6,356,117), and filing date and filing date of Sep. 29, 2000. The instant application hereby incorporates by reference the above-listed patent applications.

BACKGROUND

1. Field of the Invention

The present invention relates to the design of digital circuits. More specifically, the present relates to a method and an apparatus for asynchronously routing data within a circuit between multiple sources and multiple destinations.

2. Related Art

It is often necessary in computing and communication equipment to send data from many sources to many destinations. This need appears in the central processing unit of computer systems where information may flow: from a register file to any one of a number of arithmetic or logical elements or to a memory controller; from one arithmetic element to another; or from an arithmetic element or memory controller to the register file. This need also appears in the input-output systems of computers where information must flow between and among various units including processors, memories and secondary storage devices.

One common means for providing this service is known as a data bus. A bus consists of a number of wires that extend between all communicating units; there is generally one, but sometimes there are two or more wires per bit of information to be sent at any one time. Each unit that wishes to send data places its value on the data bus so that any of the receiving units may receive it. Such bus structures have been widely used both inside central computing elements and in the input-output systems for computers.

There are a number of drawbacks to such a bus structure. First, each destination must attach some transistors to the bus in order to sense its state, and because there are many destinations, these sensing transistors collectively represent a large electrical load. Second, each source must attach driving transistors to the bus to use when that source is to provide data for the bus, and even though all but one such drive transistor per bus wire is shut off when the bus changes state, the many inactive drive transistors connected to the bus also place considerable electrical load on the wires in the bus. Third, the bus wires themselves tend to be physically long and thus intrinsically represent further electrical load. The combined load on the bus wires from drivers, receivers and the wires themselves results in communication paths that are generally slow in comparison with other logical structures. Furthermore, only a single piece of information can flow per bus cycle, which limits the achievable communication rate.

One alternative to bus structure is the cross-bar switch. For each bit of communication, a cross-bar switch provides a grid of conductors that may be thought of as "horizontal" and "vertical," wherein each source drives a horizontal conductor and each destination senses the state of a vertical conductor. At each intersection of the conductors in the cross-bar, a transistor or other switching element can connect the horizontal and vertical wires that meet there. This grid structure is repeated for as many bits as are to be transmitted at any one time.

The cross-bar switch has several advantages over the bus structure. First, each source drives only the capacitive load on the horizontal wire, which amounts to one receiving switch mechanism per destination. The many drivers that would have to be connected to each wire in a bus structure are here replaced by a single driver on the source wire. Because this driver drives only the source wire and its switches, it can be as large as desired, and can thus drive its load very quickly. Moreover, the wire for each destination has a load of only one sensing transistor, though it may be connected to many inactive intersection switches. Thus, the cross-bar switch divides the inherent loading in a simple bus into two parts, the horizontal wire pathway, and the vertical wire pathway, thereby speeding up the flow of information.

A further advantage of the cross-bar switch is that it can deliver several pieces of information concurrently. Several different sources can each deliver information to several different destinations at the same time provided no two sources and no two destinations are the same, because each such communication uses a different switch to connect its horizontal source wire to its vertical destination wire. That is, two or more switches may be active at any one time provided that no two switches in the same row or in the same column are active.

The disadvantage of the cross-bar switch lies in its large number of switching transistors. While each bit of the bus structure has only one drive element per source and one receiving element per destination, the number of switch points in a cross-bar switch is the product of the number of sources and the number of destinations. Not only do these many switch points require chip area and consume power, but also they require control information. The difficulty of controlling so many switches turns out to be a disadvantage in implementation.

A second alternative to the bus structure is to use point-to-point wiring between each source and each destination. Point-to-point wiring is returning to more common use in modern systems because it simplifies the electrical properties of the transmission lines used. In a point-to-point system, each destination must be prepared to receive signals along transmission lines that begin at each source, so that the number of receivers at each destination equals the number of sources. Similarly, each source must be able to send information to each destination. Thus, the number of sending and receiving mechanisms required is the same as the number of switch points in the cross-bar switch. The point-to-point mechanism is merely a physical rearrangement of the cross-bar switches, wherein the horizontal and vertical wires in the cross-bar have become very short, and each switch at an intersection is replaced by a transmission line running from one source to one destination.

The point-to-point mechanism can be very fast. However, like the cross-bar it suffers from the need for a great deal of control information. Moreover, it is generally hard to find space for the large number of transmission lines required.

A third alternative to simple busses is to use some kind of network interconnection scheme. The Ethernet for example, is essentially a bus structure that uses itself for control, and transmits data serially. Other networks, including those with complex computer-controlled switches are well-known and widely used. Such switches appear, for example, in the Internet. Generally, however, their control is very complex and their throughput is much less than that of an equivalent bus structure.

SUMMARY

The present invention provides high throughput through a tree-structured multiplexing-and-amplifying system. Because the stray capacitance of any wire in commonly used circuitry (such as CMOS) can store data, it is possible to store many values in a multiplexer tree structure and additional values in an amplification tree structure. The present invention uses this storage to permit several communications to proceed concurrently in different parts of the structure. A new communication can be launched as soon as the wires it requires are no longer needed for the previous communication.

Instead of using a single-level bus structure, one embodiment of the present invention uses a multiple-level structure. Consider, for example, a single-level bus structure for 64 sources and 32 destinations. Each of the 64 sources must have suitable drive transistors that can put data onto the bus. Thus, the drive structure to the bus is, in effect, a multiplexer with 64 inputs. Similarly, each of the 32 destinations must have a sensing transistor connected to the bus so that any of them can accept data values from the bus. Thus, the output structure is, in effect, a 32-way fan-out from the bus to the 32 destinations.

In CMOS technology, multiplexers with many inputs can be broken into tree structures of multiplexers with fewer inputs. Although such tree structures of multiplexers contain more levels of logic than a single multiplexer, they can nevertheless be faster because each level of logic is simpler. In fact, in the book "Theory of Logical Effort," by Ivan Sutherland, Bob Sproul and David Harris, Morgan Kaufmann Publishers, Inc., San Francisco, Calif., 1999, chapter 11.4.1 teaches that in CMOS circuits the fastest multiplexing structure is a tree in which each level joins approximately four inputs. Thus, the 64 input multiplexer of our example might better be replaced with a three-level tree. The first level gathers groups of four sources together onto several short "level-1" busses; in our example there would be 64/4=16 such level-1 busses. The second level of 4-input multiplexers gathers together groups of four such level-1 busses into somewhat longer "level-2" busses; our example requires 16/4=4 such level-2 busses. Finally, a third level of 4-input multiplexers gathers these level-2 busses together into a single "level-3" bus, which need be only long enough to reach all of the inputs from the nearest part of the level-2 busses.

Furthermore, a series of amplifiers can be used to deliver a particular signal to many destinations. Such a set of amplifiers can easily be arranged into a tree structure, much like the multiplexer tree but in reverse. In our example of 32 destinations, the information on the level-3 bus might be amplified and sent to two level-4 busses. Four amplifiers on each such level-4 bus might amplify the signal again, delivering it to a total of eight level-5 busses. Again, four amplifiers on each level-5 bus might be used to amplify the signal, each delivering its output to four destinations. In spite of the fact that more stages of amplification are involved, such structures are faster than a single stage of amplification can be.

These multi-level structures have an advantage of speed, but they require extra wires to accommodate the different bus levels. Thus, the design of such a structure is always a compromise between the desired speed and the space cost of extra wiring.

A further point must be made here: it requires energy to change the value on any wire in a CMOS system. Thus, if we deliver information to all destinations always, we will consume more power than would be required to deliver the same information only to its intended destination, leaving static the state of wires that do not participate in that particular communication. As we shall shortly see, the present invention takes advantage of this potential saving in power.

Returning to our example of 64 sources, at the same time that the level-2 bus delivers information to the level-3 bus, a new source can deliver information to the level-1 bus provided the new information is kept from overwriting the previous command data. By overlapping in time the actions of different levels the structure can achieve higher data throughput rates. In fact, the throughput of such a structure is limited mainly by its ability to turn the multiplexers on and off quickly enough.

Furthermore, consecutive communications from the same source to the same destination can overlap in time. For example, as soon as the first has cleared the level-1 bus, the second may use that bus. Naturally, a small time gap between communications is required; in the limit, however, there may be as many communications underway as there are levels in the tree-structures.

Similarly, one can store information in the structure that amplifies and delivers data from the main bus to the destinations. Such an amplification structure consists of several levels of amplification, each fanning out to a next set of amplifiers and finally to the destinations themselves. Each such level can also serve as a place to store information. Thus, for example, one can overlap in time the delivery of a data item from the level-3 bus to the first level of amplification, the level-4 bus, while delivering the previously transmitted data item from the level-6 bus to its final destination.

A further advantage of the present invention is that it can operate asynchronously in time. For example, a data element launched from a particular source to a particular destination can flow along a certain path through the multiplexing structure, through the highest level bus—also known as the "trunk"—and thence through the amplifying structure to its destination. While it is in flight, some other data element launched from a different source and at an unrelated time may take its own route to its own particular destination. Two such communications will not interfere with each other except where they require a common communication path. The present invention permits each to proceed as far as it can without interfering with others, dealing with such potential interference by controlling only the sequence in which the conflicting communication actions may use the common path.

Yet a further aspect of the present invention involves automatically stalling the communication mechanism when a source is not ready to provide information or a destination is not ready to receive it. Because the interconnection structure contains storage at every level, actions already underway may proceed without waiting for a stalled source or destination irrelevant to their action. Delay in one source need not retard the communications emanating from a different source, nor need delay in accepting previous data at a destination retard delivery to other destinations, except, of course, as such other communications require the use of pathways common to the stalled communication.

Naturally, the control of such a switching structure with internal storage presents its own set of challenges. One part of the invention described herein involves a simple set of control structures which, also configured hierarchically, asynchronously control the concurrent flow of data through the switching structure from source to destination. The "switching directive" for each communication action includes a "source address," indicating the particular source for this communication and a "destination address," indicating the particular destination that is to receive this data item. A stream of such address pairs thus controls the dynamic operation of the data switching network of the present invention.

One embodiment of the present invention provides a system that facilitates asynchronously routing data within a circuit. This system includes a data destination horn, for routing data from a trunk line to a plurality of destinations. This data destination horn includes a plurality of one-to-many switching elements organized into a tree of at least one level that fans out from the trunk line to the plurality of destinations. It also includes a plurality of memory elements for storing data in transit between the plurality of one-to-many switching elements. An asynchronous control structure is coupled to the data destination horn, and is configured to control the propagation of data through the data destination horn, so that when a given data item appears at an input of a memory element, the given data item is asynchronously latched into the memory element as soon space becomes available in the memory element without having to wait for a clock signal.

One embodiment of the present invention additionally includes a data source funnel, for routing data from a plurality of sources into the trunk line. This data source funnel includes a plurality of many-to-one switching elements organized into a tree of at least one level that fans in from the plurality of sources to into the trunk line. It also includes a plurality of funnel memory elements for storing data in transit between the plurality of many-to-one switching elements. Moreover, the asynchronous control structure is additionally configured to control propagation of data through the data source funnel, so that when a given data item appears at an input of a funnel memory element, the given data item is asynchronously latched into the funnel memory element as soon space becomes available in the funnel memory element without having to wait for a clock signal.

In one embodiment of the present invention, the asynchronous control structure includes a control destination horn, including a plurality of control memory elements coupled to control inputs of the plurality of one-to-many switching elements, that contain control information to control the plurality of one-to-many switching elements. This control destination horn includes a plurality of one-to-many control switching elements organized into a tree structure that mirrors the structure of the data destination horn, thereby allowing the control information to follow associated data through the data destination horn.

In one embodiment of the present invention, the asynchronous control structure includes a control source funnel, including a plurality of source control memory elements coupled to control inputs of the plurality of many-to-one switching elements, that contain control information to control the many-to-one switching elements. This control source funnel includes a plurality of many-to-one control switching elements organized into a tree structure that mirrors the structure of the data source funnel, thereby allowing the control information to follow associated data through the data source funnel.

In one embodiment of the present invention, the tree within the data destination horn is a balanced tree.

In one embodiment of the present invention, the tree within the data destination horn is an unbalanced tree.

In one embodiment of the present invention, the trunk line and the data destination horn form a first switching module for routing data from the plurality of sources to the plurality of destinations.

In one embodiment of the present invention, the system additionally includes a second switching module coupled in series with the first switching module, so that outputs of the first switching module feed into inputs of the second switching module.

In one embodiment of the present invention, the data source funnel, the trunk line and the data destination horn form a first switching module for routing data from the plurality of sources to the plurality of destinations. In this embodiment, the system further comprises a third switching module coupled in parallel with the first switching module so that each of the plurality of sources can route data to each of the plurality of destinations through either the first switching module or the third switching module.

In one embodiment of the present invention, the order in which data elements pass through the trunk line is predetermined by the control information within the asynchronous control structure.

In one embodiment of the present invention, the order in which data elements pass through the trunk line is determined by demand for delivery of data from the plurality of sources.

In one embodiment of the present invention, a least one of the plurality of memory elements is a state conductor that carries a voltage that indicates a state of the circuit. A variation on this embodiment additionally includes a keeper circuit coupled to the state conductor that is configured to hold the voltage on the state conductor at a stable value, unless the voltage is changed by a drive circuit.

BRIEF DESCRIPTION OF THE FIGURES

FIG. 17 presents a table of interconnection attributes in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
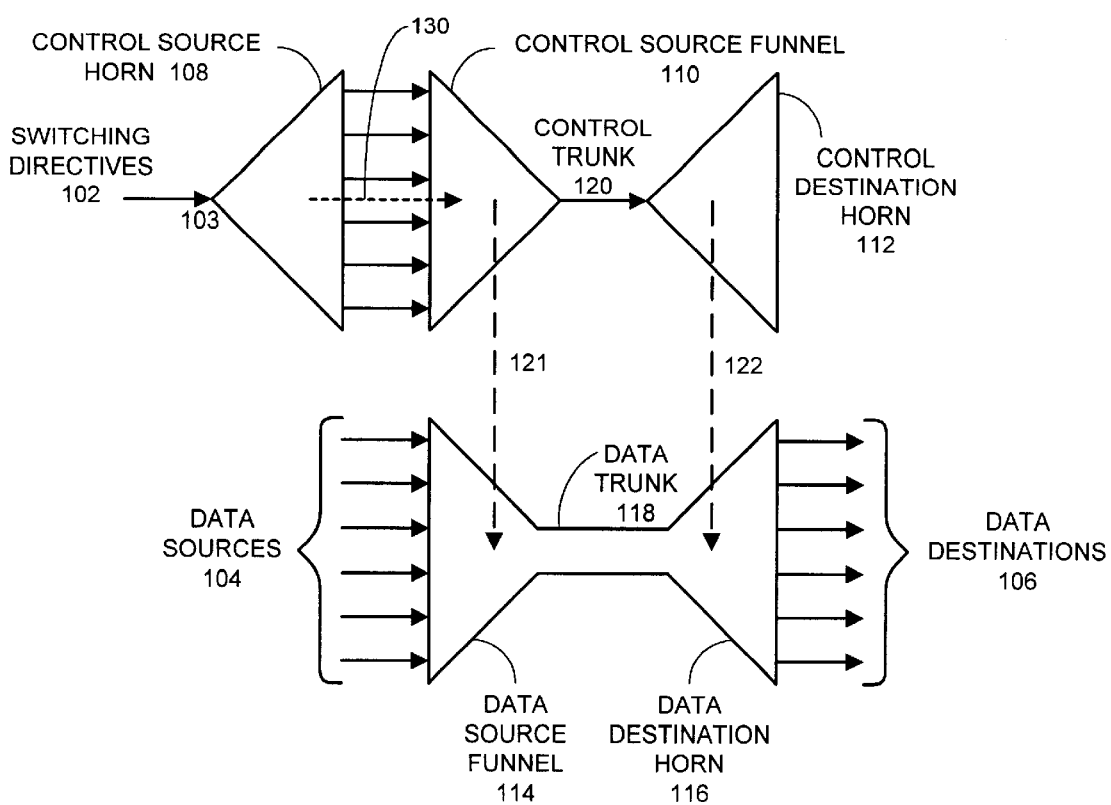
FIG. 1 illustrates a switching system for data in accordance with an embodiment of the present invention.

FIG. 1 illustrates the overall structure of one embodiment of the present invention. A data path structure including a data source funnel 114, a data trunk 118, and a data destination horn 116 can carry information from any of the sources 104 to any of the destinations 106. Data source funnel 114 includes a series of multiplexers and includes intermediate storage. Data destination horn 116 includes switched amplifiers and also includes intermediate storage. Both data source funnel 114 and the data destination horn 116 are tree structures. Data trunk 118 connects them.

To control the data path there is a control source horn 108, a control source funnel 110, a control trunk 120, and a control destination horn 112. Control source horn 108 receives switching directives 102 from its left input 103. Each of these switching directives 102 specifies one communication action by identifying a particular data source and a particular data destination.

Control source horn 108 uses the source identifier to alert the selected data source to send its data into the data source funnel 114. It also delivers to control source funnel 110 information about the route that the information will take through data source funnel 114. Control source funnel 110 uses the routing information provided by the control source horn 108 to control switches in the data source funnel 114 via control wires 121, so as to guide the data along the chosen route to the data trunk 118. The source identifier is consumed level-by-level during this process. The data destination information for the communication from the switching directive passes intact through the control source horn 108 and control source funnel 110 to reach the control trunk 120.

All of the source identifier from the switching directive is used prior to the trunk; following the trunk only destination identifier is required. The control destination horn 112 uses the destination information from the switching directive to select a route for the data through the data destination horn. Control wires 122 from control destination horn 112 activate the switches in data destination horn 116 to steer the data to its destination along the chosen route.

Because data source funnel 114 and data destination horn 116 contain intermediate storage, several communications may be underway at any one time. Control source horn 108 can accept a new switching directive before completing its processing of the previous directive. Control source funnel 110 can likewise accept fresh routing information from the control source horn 108 before completing its previous task. And likewise, control destination horn 112 can accept new destination instructions before completing a previous operation.

The throughput of the resulting system is very high because of its ability to have more than one communication in flight at a time. It is, in effect, a pipeline that branches out from the switching directive input to the sources, merges back from the sources to the trunk, and then branches out again to the destinations. It is possible to build such a pipeline control using synchronous finite state machines for the control. It is also possible to build and control such a pipeline asynchronously, as will be described further.

The asynchronous form is of particular interest because it can "wait"—i.e. postpone its next local action—an arbitrary length of time whenever required. The control can wait until another switching directive becomes available. It can also wait after control source horn 108 if the selected source is not yet able to deliver the desired data item. It can wait at the trunk if a previous communication occupies the trunk, making it temporarily unavailable for the present communication. It can wait at any of the destinations if the chosen destination is not yet able to accept the proffered data.

Indeed, the asynchronous form of control can wait at any stage of the communication. Suppose, for example, that a series of switching directives all call for delivery of data to the same destination. Suppose further that the chosen destination is not able to receive the data offered. The successive communications will "back up" in the destination horn just as automobiles may back up on a congested freeway. If the number of waiting communications is large enough, the congestion may reach back to the trunk, preventing subsequent instructions from passing through the trunk until the congestion is relieved.

In this case, the control may continue to do useful work by fetching data from the sources appropriate to subsequent communications and advancing those data as far as possible through the source funnel. When the destination blockage clears, communications waiting behind it will advance as fast as the system permits, having already achieved a "head start" and occupying positions part way through the source horn.

Data Funnel and Horn

Figure 2:
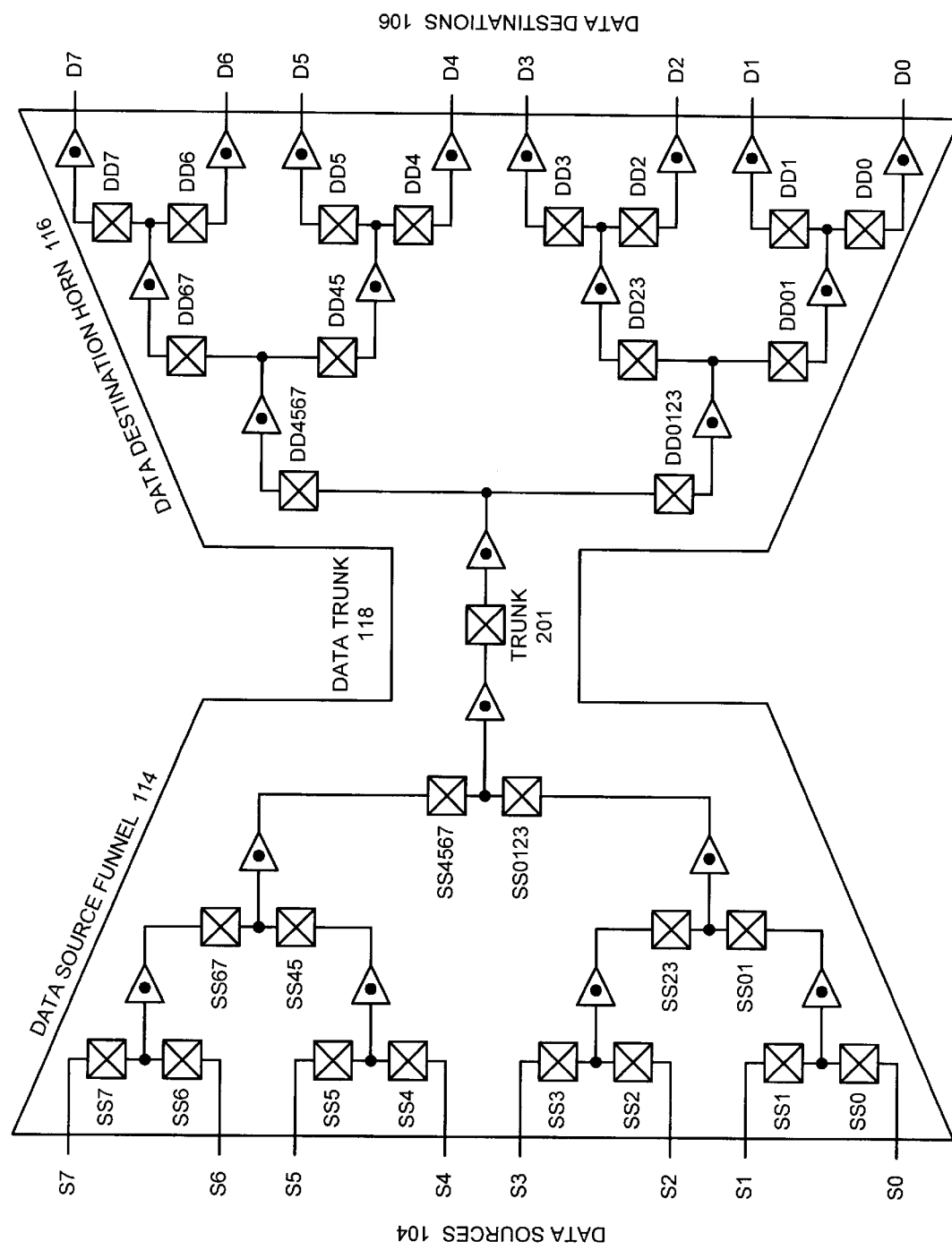
FIG. 2 is a schematic diagram of a data funnel and a data horn in accordance with an embodiment of the present invention.

FIG. 2 illustrates a simplified data path for the present invention. For ease of understanding, FIG. 2 shows two-way junctions and branches, but three-way, four-way, and indeed N-way branches and junctions are possible, and the degree of junction may vary from place to place within data source funnel 114. One can think of FIG. 2 either as representing a single bit of the communication system or as representing many such bits operating in parallel on "words" of data.

On the left of FIG. 2 appear eight sources of data, labeled S0 to S7. Of course, there might be more or fewer sources, as should be obvious. Data source funnel 114 connects these sources to the data trunk 118. Data source funnel 114 is a multi-level multiplexing structure with internal storage.

At the right of the FIG. 2 are eight destinations for data D0–D7. Connecting data trunk 118 to these destinations is the data destination horn 116, which includes a multi-level amplification structure with internal storage. FIG. 2 illustrates data destination horn 116 as having two-way branches throughout, but as in data source funnel 114, other branching structures are possible including three-way, four-way, and N-way branches, and the degree of branching may also vary from place to place in data destination horn 116.

Figure 3:
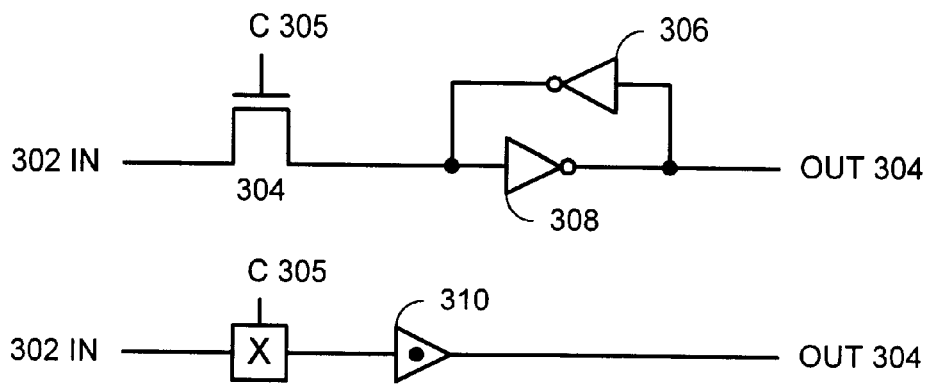
FIG. 3 illustrates one form of a sticky buffer in accordance with an embodiment of the present invention.

In FIG. 2, a triangle with a dot in it represents a "sticky buffer". Depending on the form of the multiplexer, a sticky buffer may be as simple as just a wire or may consist of a single inverter. The form of sticky buffer shown in FIG. 3 includes a strong inverter 308 to provide large output drive capability, and a small feedback inverter 306 that helps to retain for extended periods the value at the input to the large inverter 308. The circuit illustrated in FIG. 3 also includes a switch 304. If extended retention of information is unnecessary, the small inverter 306 may be omitted. The purpose of the sticky buffer is to retain on its output whatever value is applied to its input. Any number of latch-type circuits or capacitive storage circuits are suitable for this purpose.

The boxes with crosses in them in FIG. 2 represent pass gates or switches. The combination of pass gate and sticky buffer appears in more detail in FIG. 3. Each such pass gate or switch may be rendered transparent or opaque under control of its control wire or wires 305. The control wires are omitted from FIG. 2, even though each switch has such control wires extending from control source funnel 110 to data source funnel 114. It is via these control wires that control source funnel 110 guides the data routing action of data source funnel 114. These control wires appear, collectively, as the dotted arrows 121–122 extending downwards in FIG. 1.

Figure 4:
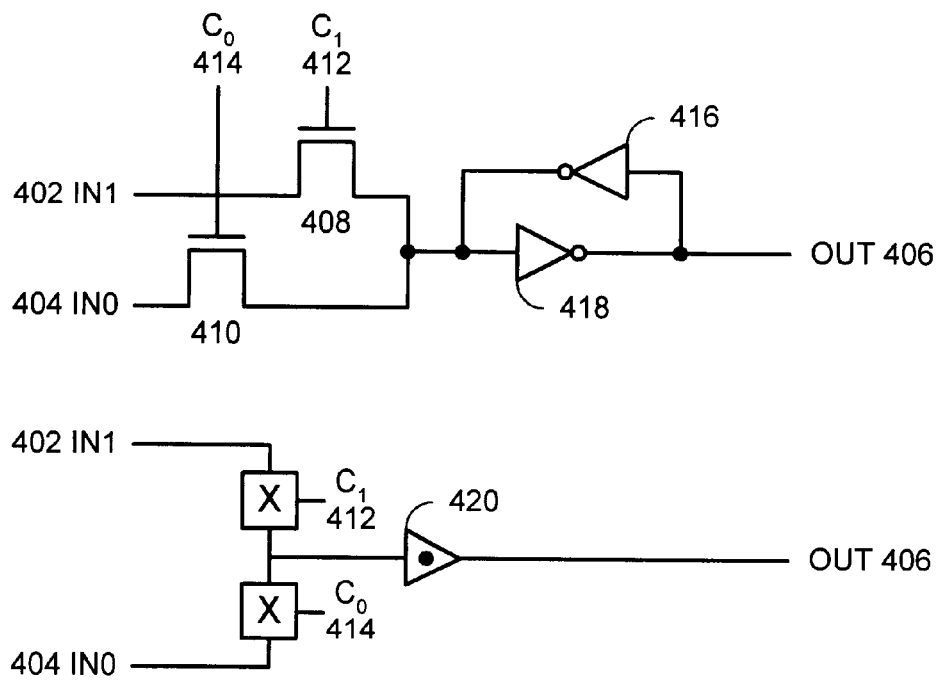
FIG. 4 illustrates one form of a multiplexer and sticky buffer together in accordance with an embodiment of the present invention.
Figure 5:
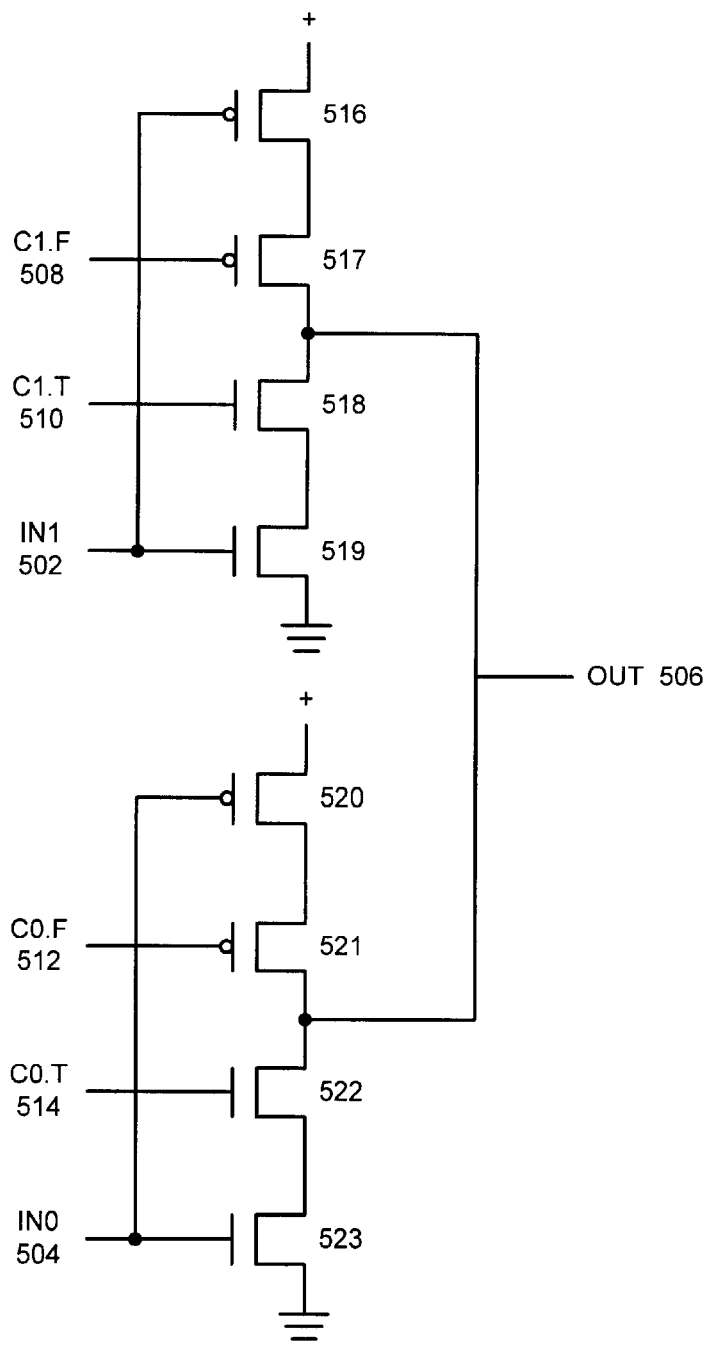
FIG. 5 illustrates another form of a multiplexer and sticky buffer together in accordance with an embodiment of the present invention.
Figure 5:
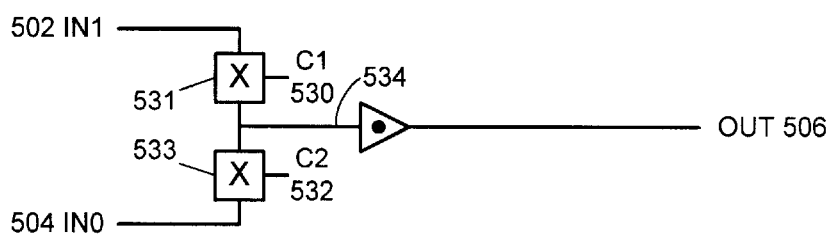

In data source funnel 114, pairs of switches selectively route one of two input signals to the input of a sticky buffer. The combination of several such switches forms a multiplexer, as well known in the art. When combined with a sticky buffer as in the FIG. 3, the combination retains the value of whichever input was last selected. FIGS. 4 and 5 show alternate forms of the multiplexer and sticky buffer together.

The control system will in general avoid rendering transparent concurrently more than one element in each multiplexer. For each switching element rendered transparent, the multiplexer takes data from a different data input and delivers it to the output. When no switching element is transparent, the storage aspect of the multiplexers of the present invention ensure that the output remains fixed at its latest value. In technologies other than CMOS, it may be necessary to provide active logic to retain the value when no input is selected.

In data destination horn 116, each switch controls the flow of the input data to a separate sticky buffer. The combination of switch and sticky buffer is essentially a latch, of which many forms are known in the art. The simplest form of latch, of course, uses a wire 534 as the storage element, as indicated in FIG. 5.

Of course, all of the switches in the data destination horn 116 could be rendered transparent at once without harm. Doing so, however, would have two bad effects. First, any change at the input to data destination horn 116 would change the values on all of the wires in the horn, thus dissipating energy needlessly. Second, after each such change, the next change at the input would have to wait until all of the sticky buffers and switches had received the first piece of information. By keeping switches in data destination horn 116 opaque unless essential to a particular communication, the present invention avoids both difficulties.

It is easy to see that the tree structure arrangement of the data source funnel 114 and data destination horn 116 provide a path from any of the sources on the left of FIG. 2 to any of the destinations on the right. For example, the path from S2 on the left to D5 on the right uses the switches labeled SS2, SS23, SS0123, TRUNK, DD4567, DD45, and DD5. Were all these switches rendered transparent at once, a connection would exist from S2 on the left to D5 on the right. However, if all the switches along the path were rendered transparent, it would still take data some time to pass along the path because each switch and each sticky buffer adds its own characteristic delay. Moreover, one would have to wait for data to finish flowing through a first such path before one could establish a second such path.

In distinct contrast to rendering all of the switches along the path transparent at the same time, the control mechanism of the present invention renders them transparent in sequence. First, the switch nearest the source, e.g. SS2, is momentarily transparent, passing a data element from source S2 to the input of the next sticky buffer and thence to the upper terminal of SS23. The data thus put into the structure remains there as long as necessary. Next, rendering switch SS23 momentarily transparent copies the data into the next sticky buffer and thence to the lower terminal of switch SS0123. Again the data will stay there. Notice that the location that previously held the data is now free for some other use.

In FIG. 2 there are seven separate columns containing switches. Each of these can pass data to its right into another sticky buffer. Thus, if all switches operate in sequence, there will be seven intervals during which a switch in a "next" column will become momentarily transparent.

There is no harm in starting a second communication before completing the first one. Switches in different columns may be transparent at the same time without harm to data that has already passed further to the right. Thus, the structure forms a merging-and-then-branching pipeline. In general, ripples of transparency travel from left to right through the structure as fast as possible, but never faster than the data can flow through the switches and sticky buffers.

The structure has an inherent "latency," which is the time it takes to move data from the left to the right, as well as a "throughput," which is the rate at which new data elements may enter it and depart from it. Because more than one element can be in flight through the structure at any one time, its throughput is higher than that of a network of similar latency but without the intermediate storage.

But there's more! It is possible for the control to render transparent at the same time several switches in the same column, provided only that their outputs do not conflict. Thus, for example, SS2 and SS6 might be transparent together, delivering data concurrently from their respective sources, S2 and S6, to their respective level-1 busses. Again, SS23 and SS67 might also be rendered transparent concurrently without harm. Thus, data from S2 and S6 might travel concurrently up to the inputs of switches SS0123 and SS4567 respectively. Here, of course, only one communication can proceed through the trunk, and so the control must establish a sequence for the two communications. Concurrent communication is important when some part of the network is blocked; for example because a source is temporarily unable to provide data or a destination is temporarily unable to receive data.

Control Mechanism

Any one of a number of control systems are possible. The data path of FIG. 2 is controlled solely by the switch control signals represented by the descending dotted lines 121–122 in FIG. 1. When and how the control renders these switches transparent is a matter of design choice and determines the structure of the control parts of FIG. 1. One embodiment of the present invention uses an asynchronous pipeline control.

Such an asynchronous pipeline control appears in FIG. 1. It has a "control source horn" 108, a "control source funnel" 110 and a "control destination horn" 112. Control source funnel 110 and the control destination horn 112 control the actions of their counterpart data source funnel 114 and data destination horn 116 via the control wires 121–122. These control paths ensure that actions in the data path follow actions in the control structure either when the control actions occur or slightly thereafter.

For illustrative purposes, FIG. 2 and subsequent figures illustrate the control source horn 108, control source funnel 110, and control destination horn 112 as balanced trees with branching ratio of two. However, the branching ratios for each might differ, and one or more of them might be unbalanced as suits the need of a particular design. An unbalanced tree has a deeper structure in one part than in another as is described in more detail with reference to FIG. 20 below.

Switching directives 102 enter the control structure from the left side of FIG. 1. Each switching directive carries a source address and a destination address and may carry additional information if desired. The information in the source address must be sufficient to uniquely specify each source and the information in the destination address must be sufficient to uniquely specify each destination in the system. The address information may be encoded in binary or any other suitable form. In the example shown in FIG. 2, three bits of source address and three bits of destination address suffice to specify the eight sources and eight destinations shown.

Control Source Horn

Figure 6:
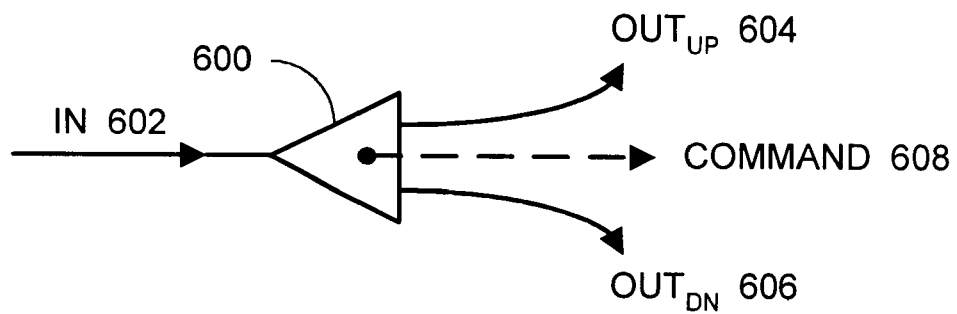
FIG. 6 illustrates one unit for the control source horn in accordance with an embodiment of the present invention.

FIG. 6 shows a single branch element from the control source horn 108. It receives a switching directive on its left input 602 which indicates whether it will respond via its upper output 604 or its lower output 606. It passes the switching directive out the selected output, where it generally enters another, similar, branch element at the next level of the tree. The next level of the tree is responsive to a different part of the switching directive to control the further flow of the switching directive towards the output of control source horn 108. In this way, the switching directive activates only those parts of the source horn that lie in a path from its entry point to the particular source element it addresses. For example, to reach source location S2, the switching directive flows on a path through the tree of switching units in control source horn 108 between its entry point and that source location.

In addition to passing the switching directive to another part of control source horn 108, each element of the horn passes information about the steering choice that it made through its "command" output 608. This information passes to a matching merge element in control source funnel 110 to determine the action of the corresponding merge element. One such command signal passes from each switching element in control source horn 108 to a corresponding element in the control source funnel 110.

Control source horn 108 is a tree of switching elements that provide two forms of output from control source horn 108. One set of outputs corresponds to the sources, S0 . . . SN, and indicates to the source control logic that it should begin to communicate its data. The other set includes the central command outputs (like command output 608 in FIG. 6) from each source branch unit represented in FIG. 1 as dotted line 130. These pass to the control source funnel 110 and control the actions of control source funnel 110.

Figure 20:
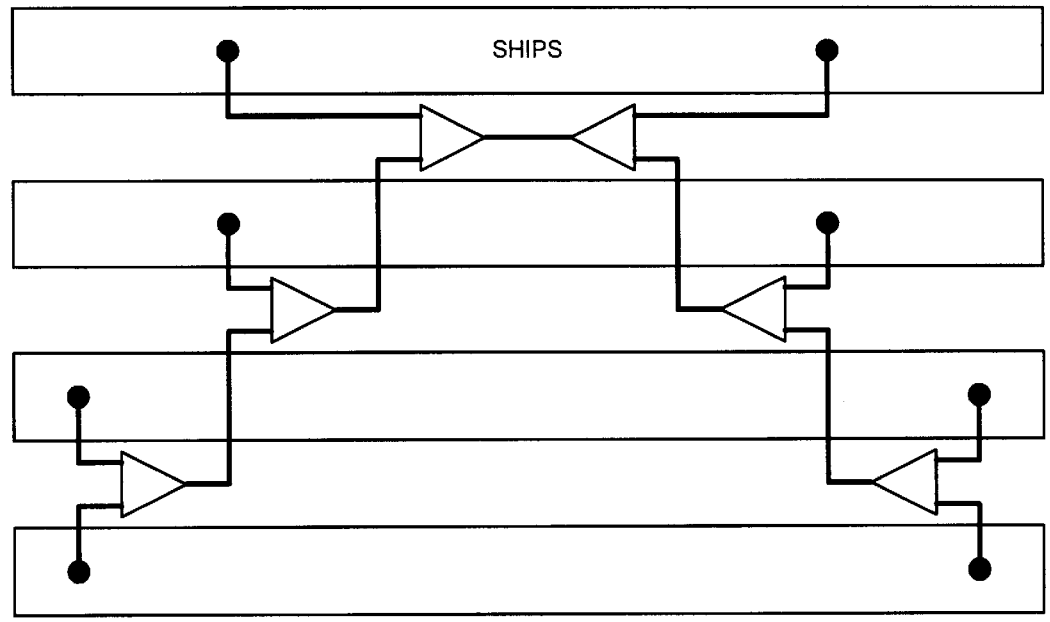
FIG. 20 illustrates a Huffman tree layout for a switching system in accordance with an embodiment of the present invention.

Note that the internal structure of one embodiment of branch element 600 of FIG. 6 is illustrated in more detail in FIG. 20 of a related application by inventors Ivan E. Sutherland, Scott M. Fairbanks and Josephus C. Ebergen, entitled "Method and Apparatus for Asynchronously Controlling State Information within a Circuit," having Ser. No. 09/676,430, and filing date Sep. 29, 2000. This related application is hereby incorporated by reference to provide details of this internal structure.

Control Source Funnel

Figure 7:
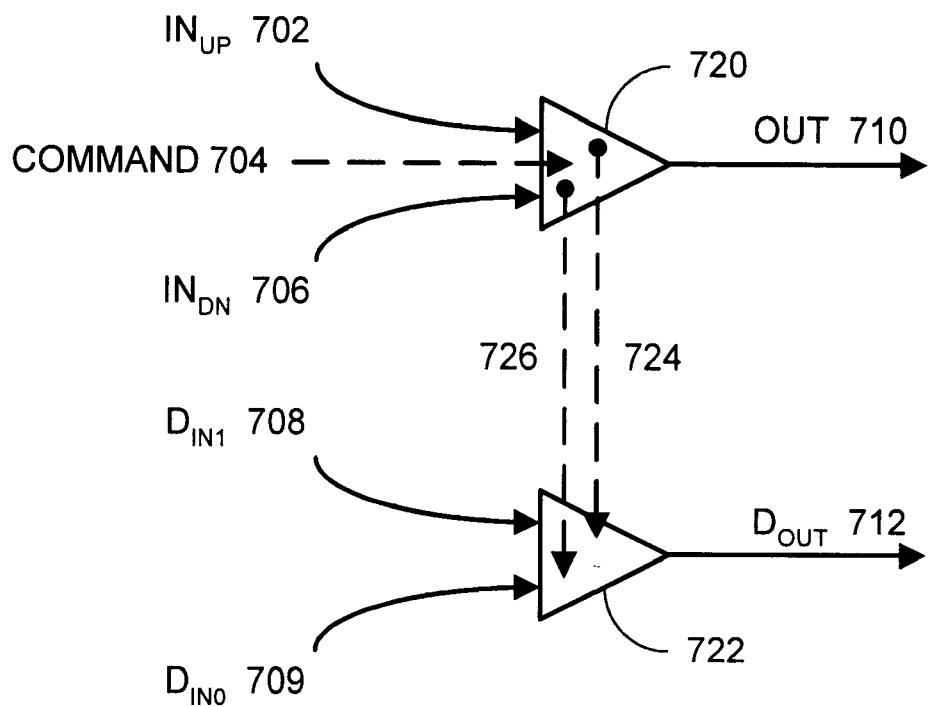
FIG. 7 illustrates how one unit from the control source funnel controls a corresponding unit from the data source funnel in accordance with an embodiment of the present invention.

FIG. 7 shows a single merge element 720 from control source funnel 110 and its corresponding element 722 in the data source funnel 114. Switching element 720 in control source funnel 110 accepts commands along its command input 704. These commands originate from the corresponding switching element in the control source horn 108 and indicate whether the funnel element is to take a switching directive from its upper input 702 or its lower input 706. When both the command and the chosen switching directive at upper input 702 or lower input 706 are available, the merge element 720 acts and delivers the switching directive at its output 710. It also provides control signals 724 and 726 to data merging element 722 that cause it to pass forward data in a matching manner. Thus, as the switching directive moves through control source funnel 110, so the data moves through data source funnel 114.

Note that the internal structure of one embodiment of merge element 720 of FIG. 7 is illustrated in more detail in FIG. 21 of a related application by inventors Ivan E. Sutherland, Scott M. Fairbanks and Josephus C. Ebergen, entitled "Method and Apparatus for Asynchronously Controlling State Information within a Circuit," having Ser. No.

09/676,430, and filing date of Sep. 29, 2000. This related application is hereby incorporated by reference to provide details of this internal structure.

Figure 8:
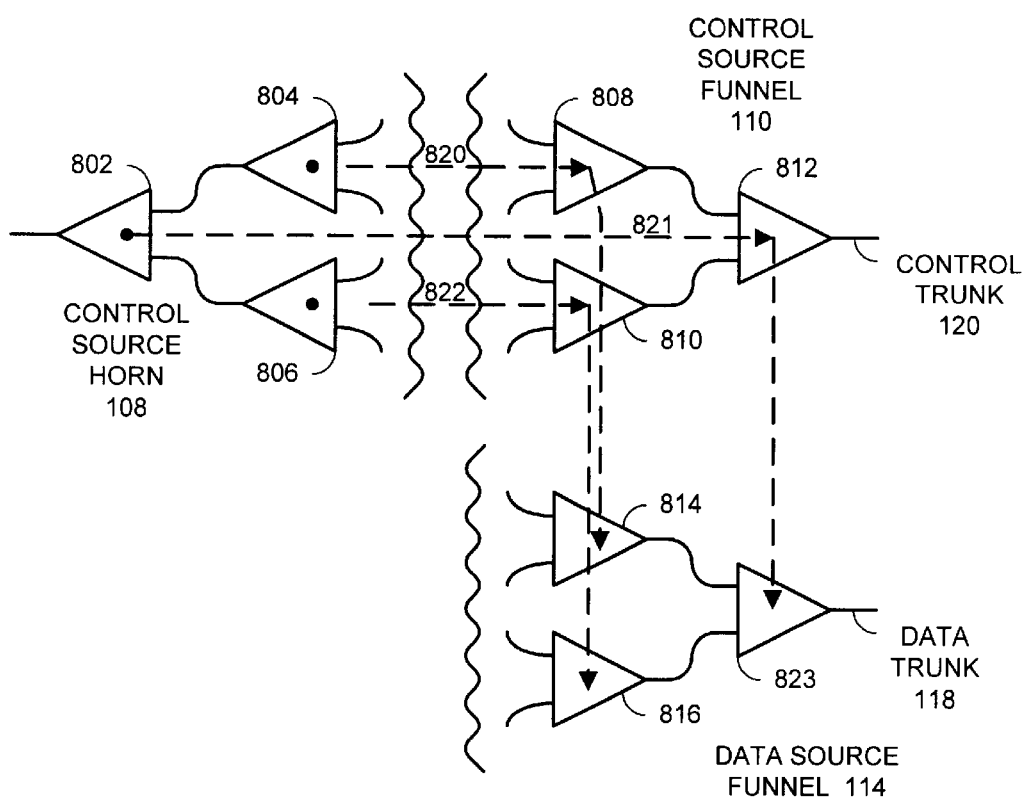
FIG. 8 illustrates how units from the control source funnel control units from the data source funnel in accordance with an embodiment of the present invention.

FIG. 8 shows two levels of switching in control source horn 108 and the corresponding two levels in control source funnel 110 and data source funnel 114. On the left side of FIG. 8 is a first level of branch unit 802 and a second level including two branch units 804 and 806. On the right side of FIG. 8 is a corresponding second level consisting of two merge units 808 and 810 and a corresponding first level, merge unit 812. Each branch unit communicates its branching choices to the corresponding merge unit along the command pathways 820–822. Each of these command pathways consists of a first-in-first-out (FIFO) storage unit so that several commands may reside in the FIFO from the time they are issued by the branch unit until they are consumed by the merge unit.

The first branch unit 802 delivers each switching directive to either branch unit 804 or branch unit 806 according to information contained in the switching directive. In addition, it delivers information about its choice through command path 821 to corresponding merge unit 812, which is part of control source funnel 110.

A stream of switching directives enters from the left. Each is diverted either up or down in the first branch unit 802 and further diverted by the second level branch units 804 and 806. Eventually, those switching directives come back to the corresponding inputs of the merge units. Each merge unit takes as input such switching directives from above or below in the same sequence in which its corresponding branch unit distributed them. Thus, the switching directives emerge from the output of the final merge unit in the same sequence in which they entered the first branch unit.

It must be recognized that this entire control system can operate asynchronously. Each of the pathways described carries not only a switching directive or a steering command, but also signals indicative of when such a directive or command is available for use. Moreover, each communication pathway carries signals indicative of when its receiving unit is able to receive information. Each of the units acts only when all of the inputs it requires are present and only when the unit that will receive its output is able to do so. Thus, the flow of information through the branch and merge units proceeds at a pace set by the individual delays of the units, the delay in the communication paths, and the availability of data or space for data.

Destination Horn

Figure 9:
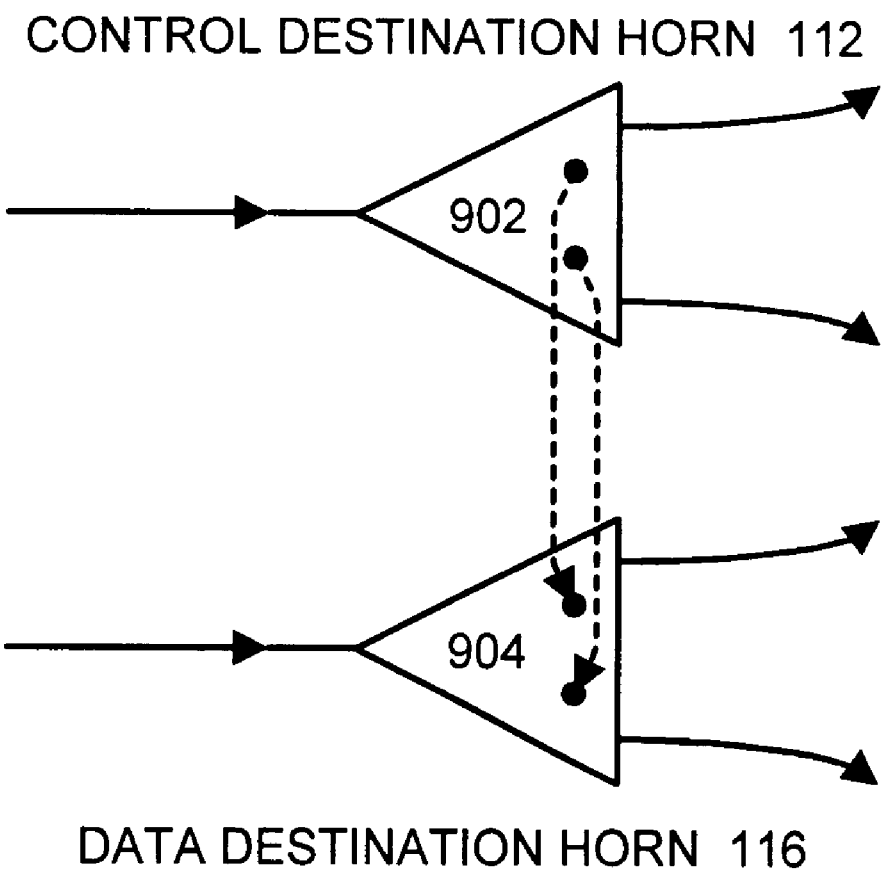
FIG. 9 illustrates how one unit from the control destination horn controls one unit from the data destination horn in accordance with an embodiment of the present invention.

FIG. 9 shows one branch unit 902 from control destination horn 112 and its corresponding unit 904 from data destination horn 116. The branch unit 902 is responsive to information from the destination part of the steering directive. It passes the steering command out its upper or lower output, much as did the branch unit in control source horn 108.

As branch unit 902 in control destination horn 112 passes the steering directive out its upper or lower output, it also controls its companion unit 904 in data destination horn 116 to pass data in the same way. A series of these units arranged in a tree structure pass data from data trunk 118 to the destinations D0 through DN.

Operation of control destination horn 112 can be entirely asynchronous. Each communication path carries signals indicative of the availability of the steering directive and the ability of the receiving unit to accept it. Thus, the flow of steering directives through control destination horn 112 can proceed as quickly as the communication and switching mechanism permit. More importantly, it can stall if either a switching directive is unavailable or space into which to place it in the next level is unavailable. Thus, the data in the data destination horn 116 moves in correspondence to passage of the switching directive through control destination horn 112 and waits whenever its corresponding switching directive waits.

Implementing the Branching and Merging Circuits

The data-dependent branch circuits in the control source horn 108 use information from the source part of the switching directive to control the flow of switching directives in correspondence with the locations of data sources. At each branch unit, the source address information that directed an upward or downward flow choice in the branch unit enters the horizontal command path to a corresponding junction unit.

The data-dependent junction units use information from the horizontal command path to select whether next to take information from above or below. Thus, the many parallel paths that start in control source horn 108 rejoin one another in control source funnel 110. Moreover, because each junction unit selects its input in exactly the same sequence as the corresponding branch unit distributed the switching directive, the switching directives emerge from each junction unit in exactly the same sequence in which they entered the corresponding branch unit.

Moreover, each junction unit activates its set of connections between control source funnel 110 and the data source funnel 114. Thus, the junction units select not only the proper switching directive in the control unit, but also in the source funnel for data, the proper data from the selected source.

The coupling between control source funnel 110 and data source funnel 114 brings data from the selected source unit to the trunk. Data elements from different sources arrive at the trunk in the sequence specified by the switching directives. At this point, the source address information from the switching directive has served its purpose and need not be carried further.

After control trunk 120, a similar process in control destination horn 112 and data destination horn 116 comes into operation. Control destination horn 112 consists of a tree of branching units, each of which uses data from the destination address portion of the switching directive to send the directive into the indicated one of its alternate outputs. As well as sending the switching directive down the proper path, control destination horn 112 also enables the switches in data destination horn 116 to send the data value down a corresponding path.

In one embodiment of the present invention, the branch and junction circuits in the control part of the circuit are built to operate asynchronously. That is, each merge or junction unit in control source horn 108, control source funnel 110, control trunk 120, and control destination horn 112 operates as quickly as it can whenever it can. A particular unit can act, of course, only when all of its inputs are present and when there is space at its outputs to receive the data it will send there. There is no need to wait for a clock signal as in a synchronous system.

This form of control, known variously as "asynchronous" or "self-timed" can operate at very high speed. It has the further important advantage that each part can wait for an indefinite period of time if data it needs are not present or space to put its result is not available.

For example, suppose that switching directive A says to send data from S2 to D6 and that the next switching directive, B, says to send data from S3 to D1. Suppose further that data are not available in S2.

Under these circumstances, control source horn 108 will deliver switching directive A to the location of S2 and switching directive B to the location of S3. Because no data are available at S2, switching directive A will have to wait. Switching directive B, however, is free to move forward with its data to the junction unit common to SS2 and SS3, called SS23 in FIG. 2. The junction unit SS23 has received the switching directive from a corresponding branch unit B23 (not shown) in control source funnel 110 telling it to take its next input from the S2 side. Thus, even though switching directive B and its data from S3 are available, both will wait. When data becomes available at S2, a junction unit can act, sending switching directive A and the data from S2 on towards the trunk. Its next action will be to send switching directive B and the data from S3 on towards the trunk.

An alternative form of the present invention is useful where the order of switching directives need not be preserved. In this form of the present invention, each junction unit accepts inputs on a first-come-first-served basis. Such a system would send switching directive B and the data from S3 forward without waiting for the data from S2.

Also, note that a horizontal path connects each branch point in the source horn to the corresponding junction in the source funnel. Like the other data paths in the system, this horizontal path is a first-in-first-out (FIFO) structure capable of holding several data elements in sequence and delivering them as required to the junction. If a particular instruction must wait for source data, another instruction following a different path may proceed to their common junction point, but not further. The junction will wait for the first instruction to arrive before considering the second, even though the first arrives later, having been delayed in transit.

Of course, as the address information flows though control source funnel 110 of FIG. 1, the corresponding data from the source flows through the data source funnel 114 of FIG. 1. Each merge point in FIG. 1 corresponds to and controls the multiplexer switches of a merge point in FIG. 2. Thus, an instruction delivered to a particular source subsequently controls the flow of data from that source to the trunk.

The third part of FIG. 1 is control destination horn 112. This is actually a much simpler structure because it contains no junction points. Control destination horn 112 distributes instructions to the destination indicated in the destination field. As the instructions go up or down in control destination horn 112, corresponding actions take place in the destination horn 116, passing data from the trunk to the chosen destination.

Larger Systems

The physical size of a switching system such as described here is set in part by the geometric placement of its sources and destinations. The communication paths of the switching system must reach the locations of the sources to receive data from them and must reach the locations of the destinations to deliver data to them.

Figure 10:
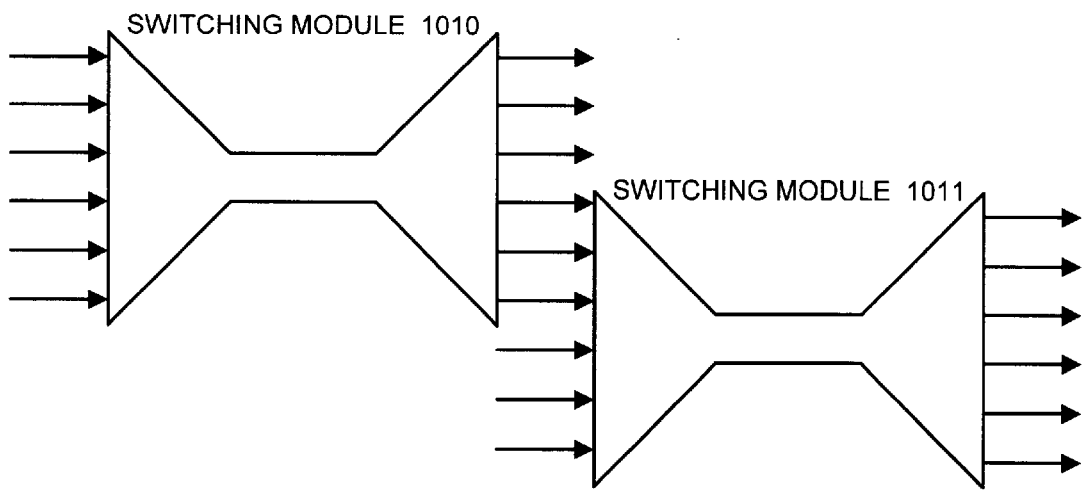
FIG. 10 illustrates two switching systems coupled in series in accordance with an embodiment of the present invention.

It is sometimes desirable to use two or more of these switching systems in tandem. In this connection, as shown in FIG. 10, one or more of the destinations of one system become sources for another. In such a tandem system, data can flow from a source through one switching system to one of the locations in common with another switching system. The data can then flow through the second switching system to its ultimate destination. Obviously, the switching directives for each of the systems must contain address information that coordinates the actions of the multiple systems. The destination specified by the switching directive in the first system must be the source specified by the switching directive in the second switching system.

Such tandem systems can provide paths that send data over long distances from one switching system to another while still retaining the simplicity of the individual switching systems.

Multiple Trunks

The rate at which the system of FIG. 1 can send data from sources to destinations is limited by the speed of its single data trunk 118. It is possible, however, to compose systems of the kind shown into more complex systems that overcome this limitation.

A parallel combination superimposes two or more switching systems on the same set of sources and destinations. Such a parallel combination allows both switching systems to operate concurrently, completing some communication paths via one of them and some via the other, thus achieving higher overall throughput.

A second alternative combination divides the set of sources and the set of destinations into parts and uses a separate switching system for each such part. The system illustrated in FIGS. 12A and 12B, for example, divides the set of sources in half and applies two separate "source" switching systems to the two parts. It also divides the set of destinations in half, applying a separate "destination" switching system to each such half. It connects the source switching systems to the destination switching systems by providing each source switching system with two intermediate destinations, and each destination switching system with two intermediate sources. The intermediate sources and destinations are connected together to make a parallel-tandem combination. This combination has higher throughput potential than a simple system because of its larger number of trunks.

Other Networks

Figure 11:
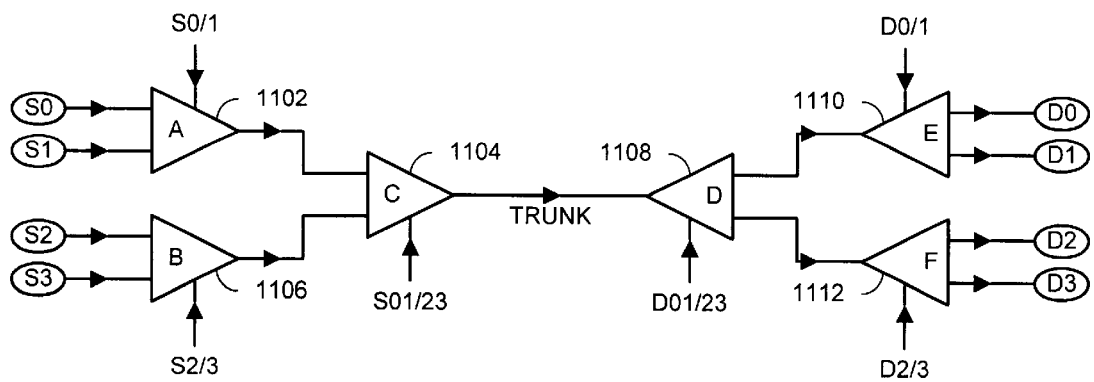
FIG. 11 illustrates an exemplary data path for a switching system in accordance with an embodiment of the present invention.

As a starting point for the following discussion, FIG. 11 shows a symbolic view of a "horn and funnel" network. The instruction decode logic is omitted, leaving only the source funnel and destination horn. The triangles represent data-dependent switches that branch an input data item to one of two destinations or merge two data inputs onto a common output channel. In each case, the incoming data are steered based on a sequence of control bits supplied to the vertical input on the side of the triangle. These control inputs are generated by decoding the source and destination address fields of move instructions. The control inputs are labeled to indicate their range of the address space. For example, the control input to switch C labeled S01/23 specifies whether the next source is one of (S0 or S1) or (S2 or S3).

Figure 12A:
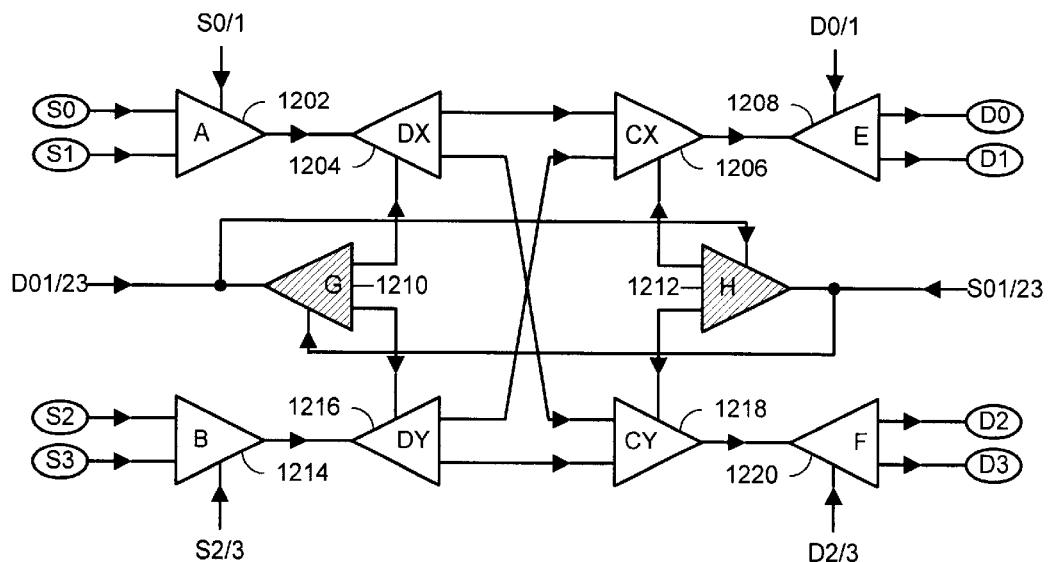
FIG. 12A illustrates another network in accordance with an embodiment of the present invention.

The network shown in FIG. 12A is a "shuffling" of the source funnel and destination horn. Note that the first and last level of switches, labeled A, B, E and F, appear the same as in FIG. 1. Switches C and D from FIG. 1 have been swapped left-to-right and replicated, appearing in FIG. 12A as CX, CY, DX and DY.

The two shaded triangles G and H switch control information only. They form an additional stage of the instruction decode network which was not needed for the network of FIG. 11. Their interconnection may appear confusing, but note that for each source to destination transfer, one of (CX or CY) and one of (DX or DY) must perform a single data move. Switches G and H ensure that the appropriate control streams are generated.

As an operational example, assume we wish to move data from source S0 to destination D3. First, source data from S0 will be selected by switch A and appear at the input of DX. The control input for DX comes from switch G and will indicate that the data should take the downward link, appearing on the top input of CY. The data will be passed to the input of switch F based on the sequence information provided by H, and thence to D3.

Figure 12B:
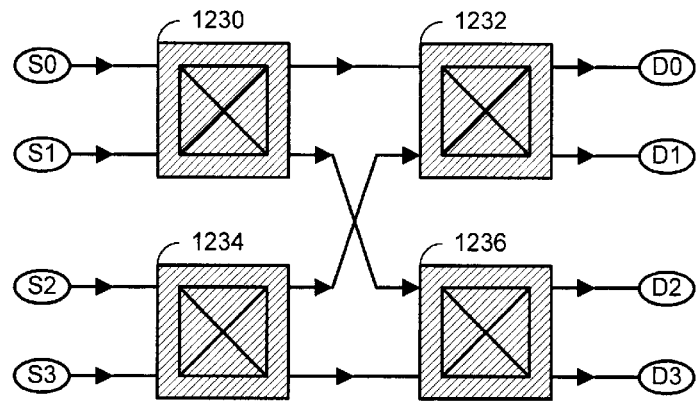
FIG. 12B presents a logical representation of the network that appears in FIG. 12A in accordance with an embodiment of the present invention.

It is interesting to abstract the network in FIG. 12A still further by grouping adjacent pairs of switches into "black boxes" and ignoring switches G and G. The result is shown in FIG. 12B. Each box now represents a switch node that can route either of its two inputs to either of its two outputs.

The switch fabric illustrates in FIG. 12A has several desirable properties. The presence of alternate trunks allows independent operations to bypass blockages as long as the data routes do not intersect. Furthermore, the network is flexible and scalable.

Many options exist for increasing the source and destination address space. For example, eight addresses could be accommodated simply by expanding A, B, E and F to be four-way switches. It also is possible to replicate the core of the network formed by CX, CY, DX and DY to form switching "islands" which could then be coupled in various ways. In fact, arbitrary networks can be implemented with appropriate instruction decoding. Consider, for example a single switching directive instruction completely decoded into a set of control bits. If we use two-way switches, one bit would be produced for each switch along the predefined unique path from the source to the destination. Instruction decode can proceed ahead of data transfer, limited only by the length of the FIFOs on each switch control input.

Figure 13:
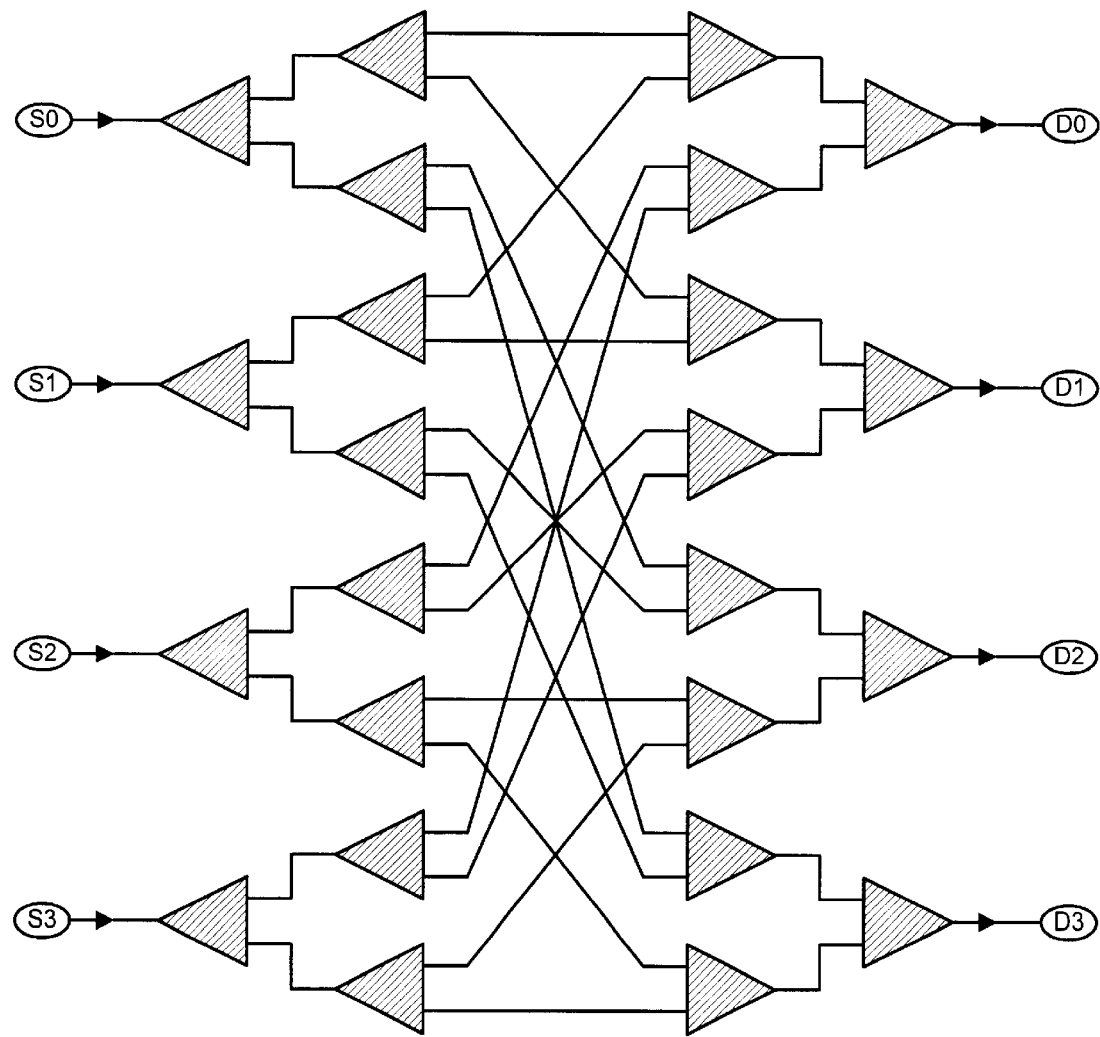
FIG. 13 illustrates a point-to-point interconnection in accordance with an embodiment of the present invention.
Figure 14:
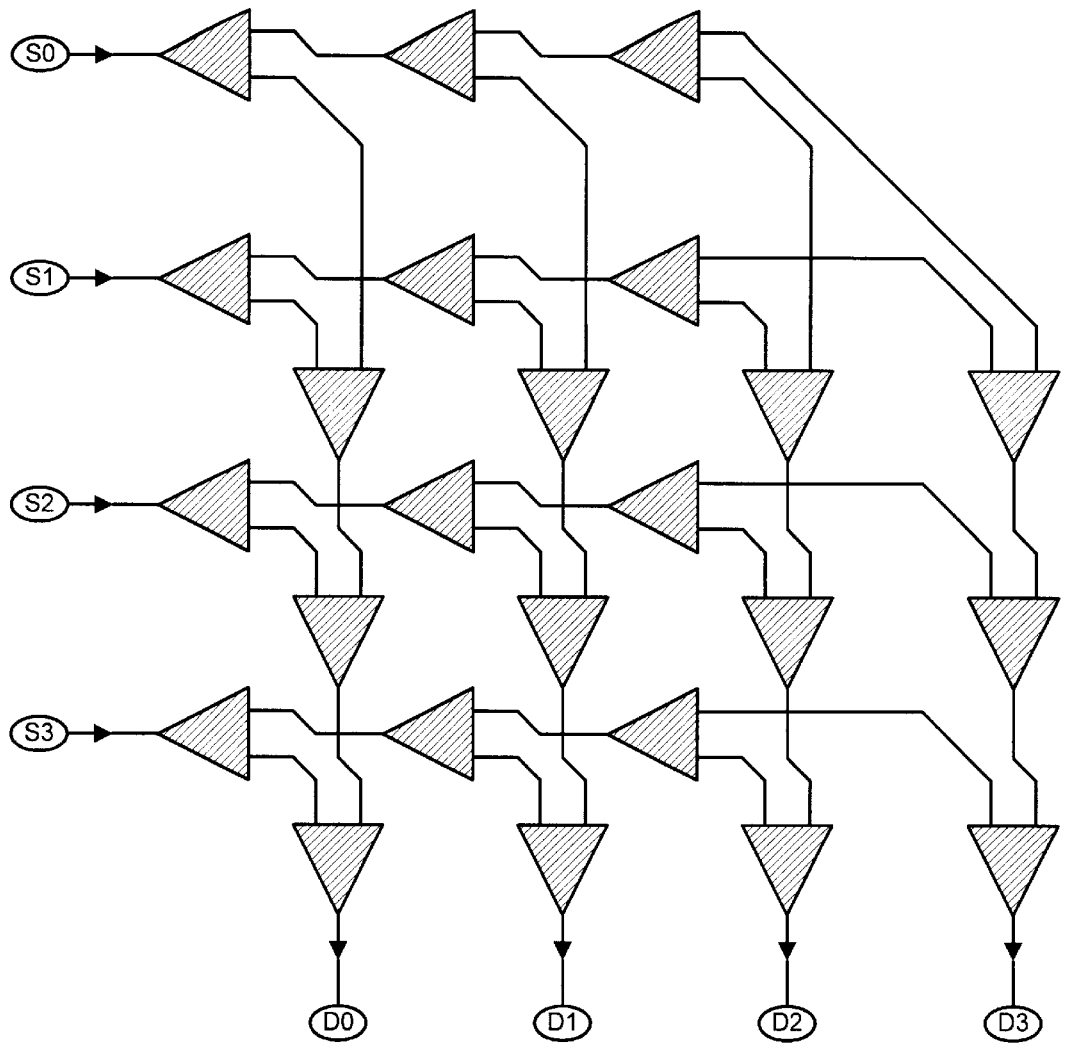
FIG. 14 illustrates an asynchronous pipelined cross-bar interconnection in accordance with an embodiment of the present invention.
Figure 15:
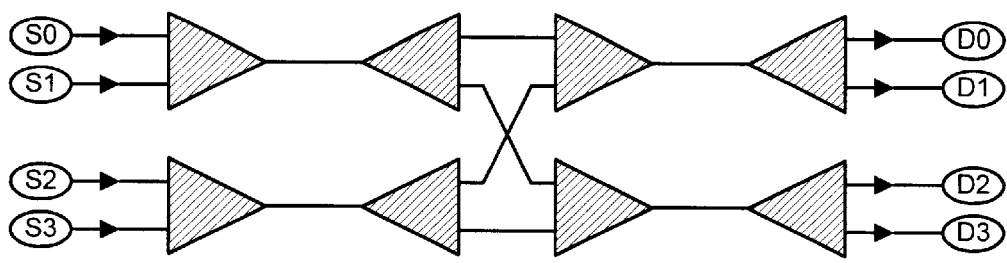
FIG. 15 illustrates an asynchronous pipelined shuffle interconnection in accordance with an embodiment of the present invention.
Figure 16:
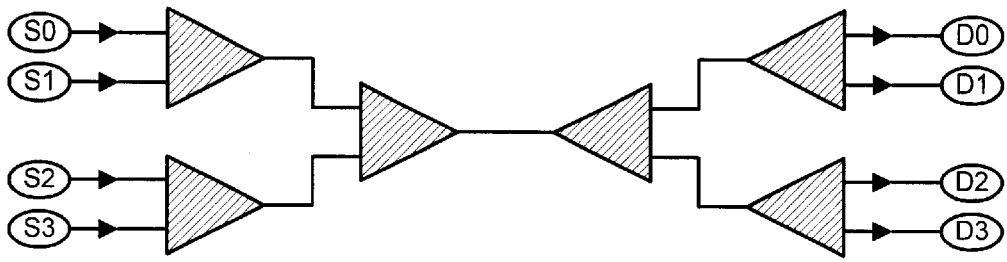
FIG. 16 illustrates an asynchronous pipelined trunk interconnection in accordance with an embodiment of the present invention.

FIGS. 13–16 illustrates examples of a number of different networks, all constructed from two-way switch elements and all designed to allow four sources to communicate with four destinations. Control connections are omitted for clarity. These networks can be viewed as asynchronous pipelined variations of some common network topologies. The network illustrated in FIG. 13 provides point-to-point connections, while the network illustrated in FIG. 14 provides a cross-bar connection. The network illustrated in FIG. 15 is the shuffle network shown previously in FIGS. 12A and 12B. The network illustrated in FIG. 16 is the familiar horn-and-funnel network as shown in FIG. 1.

FIG. 17 summarizes some relevant parameters of the network topologies in FIGS. 13–16. It is interesting to note the tradeoffs that can be made between throughput, latency, and complexity.

One application of the switch fabric of the present invention is as the communication mechanism for a general purpose computing system. In such an application, the "ships" shown in FIG. 18, comprise various parts of the computing system. For example, one ship may be an adder, another a multiplier, another a register file, and so on. Each such ship serves as one or more sources or destinations for the switch fabric. For example, the two operand inputs on an adder ship might be destinations of the switch fabric, while the output of the adder ship would be a source for the switch fabric. Thus, a single switching directive could cause the switch fabric to move the output of such an adder back to one of its inputs.

Figure 18:
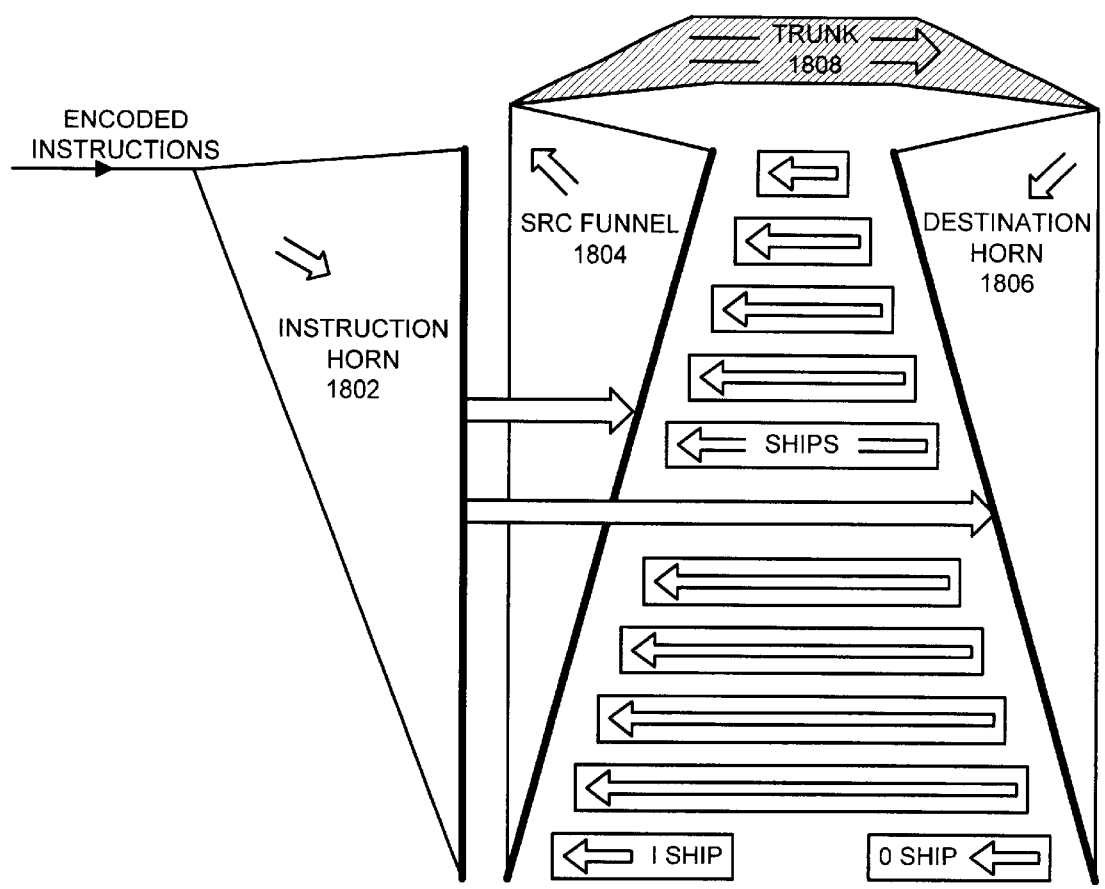
FIG. 18 illustrates a switching system in accordance with an embodiment of the present invention.

The two ships at the very bottom of FIG. 18 illustrate ships that serve only as a source or a destination for the switch fabric. For example, an output device of the computing system, such as a printer, might serve as the destination for the switch fabric, like the ship labeled "O ship" (for Output ship) at the lower right of FIG. 18. Similarly, an input device, such as a temperature sensor, might serve as a source for the switch fabric. Such devices are illustrated in FIG. 18 as the ship labeled "I ship"(for input ship) at the bottom center of FIG. 18.

Those skilled in the art will recognize that many general and special purpose processing devices can fit into the form herein described. For each application, a different set of ships (i.e. processing elements) will be appropriate. The form of the system with a switching fabric that can move data from one processing element to another under control of a switching directive will be common to all such applications.

Unbalanced Trees

The source funnel and destination horn in a switching system need not be balanced trees. It may be important to provide lower latency communication between certain sources and destinations and acceptable to have other communication paths introducing greater latency. Although the trees of FIG. 2 and FIG. 8 are balanced, they need not be. FIG. 20 shows an unbalanced tree.

In the unbalanced tree of FIG. 20, some paths from sources to destinations pass through fewer levels than others. The ones with fewer levels have lower latency, and this may be important in some applications. For example, it may be that when a particular source sends data to a particular destination it is important for the communication to be completed quickly. In ordinary computers such a "low latency" path is often called a "bypass path" and is typically used to submit the results of a previous instruction to another instruction's action more quickly that would normally be possible. In the case of the switching network, which paths should have low-latency and which should not is an important design decision that depends on the application.

Unbalanced trees may also be useful in a source horn. It may be that some sources are accessed much more frequently than others. If this is so, it may be desirable to encode the source address using a "variable length" code, such as a Huffman code. For some such codes an unbalanced source tree makes an ideal decoding mechanism. For example, the most commonly used source might be given address 1, and all others might have addresses of the form 0xxx. An unbalanced source horn can deliver any switching directive with the source address 1 to the first source while switching all others to the longer part of the source horn tree for further decoding.

There are four additional tasks involved in using a Huffman code for routing beyond what is required for unencoded instructions. The first two tasks are: encoding the instructions, and generating an address map of where the instructions are located in the external memory. Both of these two tasks can be carried out at leisure by the host computer and do not require a hardware implementation, but can instead by easily handled by software.

The second two additional tasks are: mapping instruction addresses to their locations in the memory, and decoding the instructions. These two tasks must be carried out quickly and efficiently so that they do not adversely impact system performance.

Note that a Huffman decoder can either be separate module or it can be integrated into a network. If the decoder is a separate module, it can fully decode each instruction and deliver it to the network. Furthermore, decoder modules can easily be substituted. However, placing a decoder in series between the external memory and network can reduce performance.

Integrating a Huffman decoder into a network can make the cost of decoding negligible. As so far described, the instruction horn is a full binary tree decoding structure that has minimal data path. Thus, it is possible to replace this full binary tree structure with a Huffman binary tree decoding structure. Of course, this freezes the Huffman decoder into the hardware, with the loss of flexibility to change the codes, but has the big advantage of reducing the latency for frequently used instructions.

One challenge in efficiently decoding the Huffman encoded instructions is knowing where the next instruction starts. The asynchronous environment is potentially an advantage here, since the important task is to be able to decode the most common instructions quickly, and these instructions will have short codes.

The source funnel and the destination horn module described previously in this specification are implemented as full binary trees. However, use of Huffman trees in these modules does not necessarily make the layout more difficult, or much less regular. The advantage is that it will improve performance by reducing the latency to access frequently used sources or destinations.

Because of the desire for speed, the Huffman decoder can be implemented in hardware. The decoder implementation typically applies to a single set of codes, or perhaps a small number of different sets of codes.

Huffman encoding of the instructions uses the frequency of occurrence of each instruction for code assignment, such that more frequently occurring instructions are assigned shorter length codes. Even greater compression may be achieved if each instruction is weighted by its typical execution speed.

The system can either encode the source and destination addresses separately, or the whole instruction, i.e., the source, destination pair, can be encoded together.

One embodiment of the present invention uses Huffman trees as illustrated in FIG. 18. FIG. 18 shows three triangular modules, the instruction horn 1802, source funnel 1804, and destination horn 1806. Ships are located between the source funnel 1804 and the destination horn 1806, with lengths that suggest the delay through the ship. Note that a ship is a processing unit whose inputs are destinations for the switch fabric.

The Huffman encoded instructions enter from the left, and are decoded in instruction horn 1802. The shape of this triangle is intended to illustrate the range of depth of the decode tree, with frequently occurring instructions following shorter limbs which output at the top right of this triangle, while infrequently occurring instructions follow longer limbs which output at the lower right of the triangle. An arrow illustrates the direction that instructions flow through the instruction horn. Instruction horn 1802 delivers source selections to the right-hand edge of source funnel 1804 where it connects to the ship outputs. This connection is indicated by the arrow from instruction horn 1802 to source funnel 1804. Thicker lines as used for the edges of these triangles that are connected. Also, instruction horn 1802 delivers destination selections the left-hand edge of destination horn 1806 where it connects to the ship inputs. Again, an arrow and thicker lines illustrate which of the edges of these triangles are connected.

Source funnel 1804 and destination horn 1806 are also Huffman trees that almost match the structure of instruction horn 1802, but have been adjusted to more closely reflect the frequency at which the result of one instruction is used by the next instruction and also to minimize the access latency of a few ships. The ships are located between source funnel 1804 and destination horn 1806. Arrows indicate the data flow direction through the ships. Frequently used ships, or ones that require low latency access, are located at the top of FIG. 18. Ships that are used infrequently, or have long delays, are located towards the bottom of FIG. 18. Thus, in particular, I/O ships are located at the bottom of the structure, because they have the longest delays, as shown in FIG. 18. The trunk 1808 connecting source funnel 1804 and destination horn 1806 is shown at the top of FIG. 18, and can be composed of very short wires. The direction of data flow through the trunk is from the spout of source funnel 1804 to the mouthpiece of destination horn 1806, as indicated by the arrow.

Figure 19:
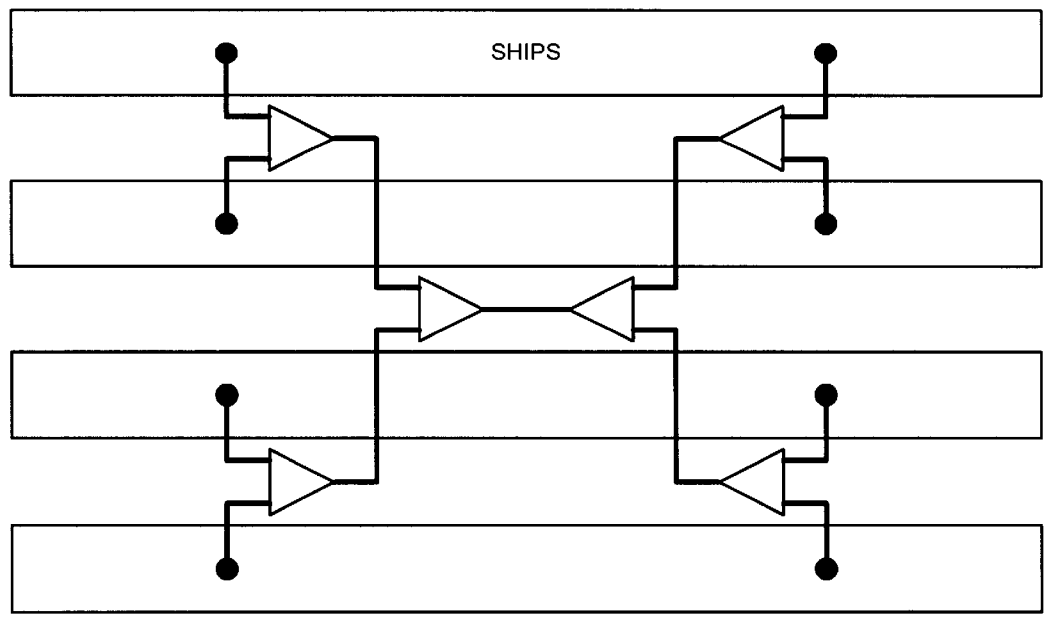
FIG. 19 illustrates balanced binary tree layout for a switching system in accordance with an embodiment of the present invention.

The impact on layout of using a Huffman tree structure versus a full binary tree structure for source funnel 1804 and destination horn 1806 is minimal, as illustrated in FIGS. 19 and 20. These figures illustrate a one-bit vertical slice of the data path of source funnel 1804 and destination horn 1806 overlaid on the ships. This example shows four ships that run horizontally, and with the data path wiring of the funnel and horn running vertically. At issue is the number of vertical data wires per bit slice, and to highlight their importance these data wires are drawn with thick lines. In both the binary tree and the Huffman tree the maximum number of vertical data wires that are encountered horizontally is the same: four wires per bit. This situation holds for larger trees. Hence, the use of Huffman trees in source funnel 1804 and destination horn 1806 has little impact on layout size.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that facilitates asynchronously routing data within a circuit, comprising:

a data destination horn, for routing data from a trunk line to a plurality of destinations;

a plurality of one-to-many switching elements, within the data destination horn, organized into a tree of at least one level that fans out from the trunk line to the plurality of destinations;

a plurality of memory elements within the data destination horn for storing data in transit between the plurality of one-to-many switching elements; and an asynchronous control structure coupled to the data destination horn, that is configured to control the propagation of data through the data destination horn, so that when a given data item appears at an input of a memory element, the given data item is asynchronously latched into the memory element as soon space becomes available in the memory element without having to wait for a clock signal.

2. The apparatus of claim 1, further comprising:

a data source funnel, for routing data from a plurality of sources into the trunk line;

a plurality of many-to-one switching elements, within the data source funnel, organized into a tree of at least one level that fans in from the plurality of sources to into the trunk line; and a plurality of funnel memory elements within the data source funnel for storing data in transit between the plurality of many-to-one switching elements;

wherein the asynchronous control structure is additionally coupled to the data source funnel, and is additionally configured to control propagation of data through the data source funnel, so that when a given data item appears at an input of a funnel memory element, the given data item is asynchronously latched into the funnel memory element as soon space becomes available in the funnel memory element without having to wait for a clock signal.

3. The apparatus of claim 1, wherein the asynchronous control structure includes a control destination horn, including a plurality of control memory elements coupled to control inputs of the plurality of one-to-many switching elements, that contain control information to control the plurality of one-to-many switching elements; and wherein the control destination horn includes a plurality of one-to-many control switching elements organized into a tree structure that mirrors the structure of the data destination horn, thereby allowing the control information to follow associated data through the data destination horn.

4. The apparatus of claim 3, wherein the asynchronous control structure includes a control source funnel, including a plurality of source control memory elements coupled to control inputs of the plurality of many-to-one switching elements, that contain control information to control the many-to-one switching elements; and wherein the control source funnel includes a plurality of many-to-one control switching elements organized into a tree structure that mirrors the structure of the data source funnel, thereby allowing the control information to follow associated data through the data source funnel.

5. The apparatus of claim 1, wherein the tree within the data destination horn is a balanced tree.

6. The apparatus of claim 1, wherein the tree within the data destination horn is an unbalanced tree.

7. The apparatus of claim 2,
wherein the data source funnel, the trunk line and the data destination horn form a first switching module for routing data from the plurality of sources to the plurality of destinations; and
wherein the apparatus further comprises a second switching module coupled in series with the first switching module, so that outputs of the first switching module feed into inputs of the second switching module.

8. The apparatus of claim 2,
wherein the data source funnel, the trunk line and the data destination horn form a first switching module for routing data from the plurality of sources to the plurality of destinations; and
wherein the apparatus further comprises a third switching module coupled in parallel with the first switching module, so that each of the plurality of sources can route data to each of the plurality of destinations through either the first switching module or the third switching module.

9. The apparatus of claim 4, wherein the order in which data elements pass through the trunk line is pre-determined by the control information within the asynchronous control structure.

10. The apparatus of claim 2, wherein the order in which data elements pass through the trunk line is determined by demand for delivery of data from the plurality of sources.

11. The apparatus of claim 3, wherein a least one of the plurality of control memory elements is a state conductor that carries a voltage that indicates a state of the circuit.

12. The apparatus of claim 11, further comprising a keeper circuit coupled to the state conductor that is configured to hold the voltage on the state conductor at a stable value, unless the voltage is changed by a drive circuit.

13. An apparatus that facilitates asynchronously routing data within a circuit, comprising:
a data source funnel, for routing data from a plurality of sources into a trunk line;
a plurality of many-to-one switching elements, within the data source funnel, organized into a tree of at least one level that fans in from the plurality of sources to into the trunk line;
a plurality of funnel memory elements within the data source funnel for storing data in transit between the plurality of many-to-one switching elements; and
an asynchronous control structure, coupled to the data source funnel, that is configured to control propagation of data through the data source funnel, so that when a given data item appears at an input of a funnel memory element, the given data item is asynchronously latched into the funnel memory element as soon space becomes available in the funnel memory element without having to wait for a clock signal.

14. The apparatus of claim 13, wherein the tree within the data source funnel is a balanced tree.

15. The apparatus of claim 13, wherein the tree within the data source funnel is an unbalanced tree.

16. The apparatus of claim 13, wherein a least one of the plurality of funnel memory elements is a state conductor that carries a voltage that indicates a state of the circuit.

17. The apparatus of claim 16, further comprising a keeper circuit coupled to the state conductor that is configured to hold the voltage on the state conductor at a stable value, unless the voltage is changed by a drive circuit.

18. A method for asynchronously routing data within a circuit, comprising:
routing the data from a trunk line to a plurality of destinations through a data destination horn;
wherein the data destination horn includes a plurality of one-to-many switching elements organized into a tree of at least one level that fans out from the trunk line to the plurality of destinations;
storing the data in a plurality of memory elements within the data destination horn while the data is in transit between the plurality of one-to-many switching elements; and
asynchronously controlling the propagation of data through the data destination horn, so that when a given data item appears at an input of a memory element, the given data item is asynchronously latched into the memory element as soon space becomes available in the memory element without having to wait for a clock signal.

19. The method of claim 18, wherein prior to routing the data through data destination horn, the method further comprises:
routing the data from a plurality of sources into the trunk line through a data source funnel;
wherein the data source funnel includes a plurality of many-to-one switching elements organized into a tree of at least one level that fans in from the plurality of sources to into the trunk line;
storing the data in a plurality of funnel memory elements within the data source funnel while the data is in transit between the plurality of many-to-one switching elements; and
asynchronously controlling the propagation of data through the data source funnel, so that when a given data item appears at an input of a funnel memory element, the given data item is asynchronously latched into the funnel memory element as soon space becomes available in the funnel memory element without having to wait for a clock signal.

20. The method of claim 18, wherein asynchronously controlling the propagation of data through the data destination horn involves:

using a control destination horn, including a plurality of control memory elements, coupled to control inputs of the plurality of one-to-many switching elements, that contain control information to control the plurality of one-to-many switching elements;

wherein the control destination horn includes a second plurality of one-to-many control switching elements organized into a tree structure that mirrors the structure of the data destination horn, thereby allowing the control information to follow associated data through the data destination horn.

21. The method of claim 19, wherein asynchronously controlling the propagation of data through the data source funnel involves:

using a control source funnel, including a plurality of source control memory elements, coupled to control inputs of the plurality of many-to-one switching elements, that contain control information to control the many-to-one switching elements; and wherein the control source funnel includes a plurality of many-to-one control switching elements organized into a tree structure that mirrors the structure of the data source funnel, thereby allowing the control information to follow associated data through the data source funnel.

22. The method of claim 19, wherein the data source funnel, the trunk line and the data destination horn form a first switching module for routing data from the plurality of sources to the plurality of destinations; and wherein the method further comprises routing the data through a second switching module coupled in series with the first switching module so that outputs of the first switching module feed into inputs of the second switching module.

23. The method of claim 19, wherein the data source funnel, the trunk line and the data destination horn form a first switching module for routing data from the plurality of sources to the plurality of destinations; and wherein the method further comprises routing the data through a third switching module, coupled in parallel with the first switching module, so that each of the plurality of sources can route data to each of the plurality of destinations through either the first switching module or the third switching module.

24. The method of claim 21, wherein the order in which data elements pass through the trunk line is pre-determined.

25. The method of claim 19, wherein the order in which data elements pass through the trunk line is determined by demand for delivery of data from the plurality of sources.

26. The method of claim 18, further comprising using a state conductor as one the plurality of memory elements, wherein the state conductor carries a voltage that indicates a state of the circuit.

27. The method of claim 26, further comprising using a keeper circuit coupled to the state conductor to hold the voltage on the state conductor at a stable value, unless the voltage is changed by a drive circuit.

* * * * *